United States Patent [19]

Walters et al.

[11] Patent Number: 4,687,492
[45] Date of Patent: Aug. 18, 1987

[54] CYCLONE FOR LESSENING FORMATION OF CARBONACEOUS DEPOSITS

[75] Inventors: Paul W. Walters, Ashland; A. V. Peppard, Catlettsburg, both of Ky.

[73] Assignee: Ashland Oil, Inc., Ashland, Ky.

[21] Appl. No.: 886,760

[22] Filed: Jul. 15, 1986

Related U.S. Application Data

[63] Continuation of Ser. No. 600,914, Apr. 16, 1984, abandoned.

[51] Int. Cl.⁴ .................. B01D 45/12; B04C 5/107
[52] U.S. Cl. ........................... 55/1; 55/392; 55/413; 55/459 R; 422/147
[58] Field of Search .............. 55/392, 204, 410, 413, 55/414, 459 B, 459 A, 459 D, 1, DIG. 14; 29/401.1; 422/147; 209/144

[56] References Cited

U.S. PATENT DOCUMENTS

| | | | |
|---|---|---|---|
| 1,066,704 | 7/1913 | Brassert | 55/413 |
| 1,344,146 | 6/1920 | Peck | 55/459 D |
| 1,752,231 | 3/1930 | Clarkson | 55/410 |
| 2,015,464 | 9/1935 | Saint-Jacques | 55/459 R |
| 2,298,285 | 10/1942 | Fletcher | 55/459 R |
| 2,896,744 | 7/1959 | Chapman | 55/392 |
| 2,913,110 | 11/1959 | Rogers | 209/144 |
| 4,397,071 | 8/1983 | Liller | 29/401.1 |
| 4,519,822 | 5/1985 | Hatano et al. | 55/459 R |

FOREIGN PATENT DOCUMENTS

| | | | |
|---|---|---|---|
| 138737 | 11/1979 | Fed. Rep. of Germany | 209/144 |
| 4645 | of 1908 | United Kingdom | 55/459 R |
| 376555 | 7/1932 | United Kingdom | 209/144 |

Primary Examiner—David L. Lacey
Attorney, Agent, or Firm—Richard C. Willson, Jr.; Stanley M. Welsh

[57] ABSTRACT

Disclosed is an insert which surrounds the vapor outlet of a modified cyclone that lessens the tendency for carbonaceous deposits to form within the cyclone when separating mixtures of particulate and conversion products from high Conradson carbon feedstocks.

8 Claims, 4 Drawing Figures

CYCLONE FOR LESSENING FORMATION OF CARBONACEOUS DEPOSITS

This is a continuation of application Ser. No. 600,914, filed 04/16/1984, now abandoned.

PRIOR ART

FIELD OF THE INVENTION

This invention relates to hydrocarbon conversion processes involving cyclone separation of hydrocarbon conversion products from particulates. More particularly this invention relates to separation of hydrocarbon conversion products wherein the hydrocarbon conversion product arises from feedstocks having very high Conradson carbon content, e.g. a Conradson carbon in the range of at least about 1–12.

BACKGROUND OF THE INVENTION

U.S. Pat. No. 3,090,746 (1963) of F. Markert et. al. discloses a method for cracking hydrocarbons in a fluidized layer of fluidized system. A method was found to avoid the problem of pyrolysis products coating out on surfaces of a cyclone separator. By keeping a solid particulate phase of high temperature particles nearest the interior surface of the outside wall of the cyclone, it was possible to avoid carbonaceous buildup in the cyclone separator.

U.S. Pat. No. 3,273,320 (1966) of L. J. Delaune et. al. discloses a cyclone separator for high temperature operations. A specially designed cyclone outlet tube (made from refractory materials such as alumina, magnesia, beryllium and silicon carbide) is disclosed to provide free movement for thermal expansion to minimize internal stress concentration. These materials are also disclosed to be useful on the interior surface of a cyclone separator. The invention appears to be directed to overcoming stresses that would otherwise arise as a result of expansion and contraction at operating temperatures in the range of between 1093° C. (2000° F.) and 1760° C. (3200° F.). The outlet tube is concentric to the interior of outside walls.

Not disclosed in U.S. Pat. No. 3,273,320 (1966) is the use of an off centered outlet tube which provides benefits to be discussed later in this specification.

U.S. Pat. No. 3,572,011 (1971) of Gunnar Wilhelmsson discloses a filtering apparatus having a rotatable filter drum with a cylindrical filter surface mounted within a housing which introduces material in a swirling pattern so as to swirl into contact with and thru the filter surface. Also disclosed is a means for removing material from the filter surface. This apparatus in no way suggests separation of vapors and particles in the sense of a cyclone separator and is considered non analogous art except that it arguably may disclose an off centered outlet tube.

U.S. Pat. No. 4,070,250 (1978) of Charles K. Choi discloses a pyrolysis of carbonaceous materials in a double helix cyclone. The inlet to the cyclone has three separate pathways. The first pathway nearest the exterior wall of the cyclone is for a high velocity particulate/vapor stream, wherein the heated particulates provide a source for heat. The next stream adjacent to and spaced from the particulate/vapor stream is a low velocity stream of carbonaceous material. And spaced apart from the carbonaceous vapor stream is a third stream which is preferably at an angle to the carbonaceous vapor and spaced inwardly toward the vapor outlet tube. The three streams react to undergo pyrolysis reactions and then are separated into vapors and solid particles. The outlet tube is substantially concentric to the cyclone body. Carbon buildup along the wall is disclosed to be avoided by having a high velocity high temperature particulate stream nearest the interior surface of the outside cyclone wall.

U.S. Pat. No. 4,101,412 (1978) of C. K. Choi discloses an integrated system for the pyrolysis of carbonaceous materials. A stream of carbonaceous material is tangentially introduced at a high velocity along the path formed by the curved surface of the cyclone reaction/separation zone. Also introduced to the cyclone reaction/separation zone is a high velocity high temperature stream of a particulate source of heat contained in a carrier gas. The particulate heat source penetrates the stream of carbonaceous material to initiate pyrolysis of carbonaceous components. In essence two separate streams are introduced one at an angle to the other into a cyclone separator. In FIGS. 2 & 3 of this reference, there is disclosed a somewhat off centered cyclone outlet tube with respect to the interior of a cyclone separator.

U.S. Pat. No. 4,151,044 (1979) of C. K. Choi discloses substantially the same information as was disclosed in U.S. Pat. No. 4,070,250 (1978) discussed hereinabove.

U.S. Pat. No. 4,212,653 (1980) of W. B. Giles discloses a process and apparatus for separating particulate matter from a gaseous medium. Two different vapor streams are disclosed as being introduced into a cyclone concentrically with respect to a vapor outlet tube. One of the streams, substantially particulate free, is introduced so as to form a swirling phase of substantially contaminate free gas immediately surrounding the outlet tube. The other stream, a vapor having particulate, is introduced concentrically with the outlet tube but at a location spaced away from the first stream of swirling gas. The inventive feature is that by having a substantially contaminate free vapor immediately adjacent the outlet tube provides better separation of the particles from the gaseous vapor components.

The cyclone disclosed by Giles is substantially different from any cyclone contemplated by the instant invention in so far as Giles is attempting to use two vapor streams to bring about an improved separation of particulates present in one of the streams. The additional circumferential wall inserted in a cyclone contemplated by the instant invention is not there as a means for introducing a second vapor stream. It is serving a purpose entirely different and distinct from any purpose disclosed by Giles.

U.S. Pat. No. 4,246,013 (1981) of Andrew Truhan et. al. discloses a cyclone type air-particle concentrator and collector wherein a dirty gas stream is subjected to two distinct skimming operations. One of these operations is between the gas inlet scroll and the outlet tube and the other at the exit of the gas discharge scroll. More than one outlet for a vapor stream is provided so that the vapor stream with reduced particulate concentration is removed in two separate streams one between the gas inlet scroll and the outlet tube and the other at the exit from the gas discharge scroll.

This reference of Andrew Turhan in no way discloses off-setting at least a portion of the exterior surface of the outlet tube for vapors from being substantially centrosymmetric with respect to the longitudinal axis (defined hereinafter) of the cyclone.

U.S. Pat. No. 4,344,783 (1982) of Otto Helnemann et al discloses a heat exchange cyclone having several partial spiral or scroll inlets wherein the spirals are one above the other and decrease downward toward the material discharge opening. In other words, the spirals of different portions of the inlet have a different length which decreases downwards. The uppermost partial spiral extending over peripheral angle of at least 180° and the lower most partial spiral extending over a peripheral angle of at least 90°. The purpose of the disclosed scroll inlet designs is to substantially reduce the overall volume weight of the cyclone for substantially the same pressure loss and degree of separation. Each partial spiral of the scroll inlet is about a common axis, the longitudinal axis of the exchange cyclone.

This reference of Otto Helnemann et al. in no way discloses off-setting at least a portion of the exterior surface of the outlet tube for vapors from being substantially centrosymmetric with respect to the longitudinal axis of the cyclone.

With diminishing sources of crude supplies, there is an increasing trend towards reduced crude conversion. Reduced crude conversion involves feedstocks that generally have very high metals and very high Conradson carbon precursors. Catalytic cracking of such feeds require separation of particulate catalysts or sorbents from vapors. The art teaches that if there is a high concentration of particles along the exterior wall of a cyclone separator then carbonaceous deposits on the wall of the cyclone tend to be reduced and substantially avoided. See U.S. Pat. Nos. 4,070,250 (1978) and 4,151,044 (1979) discussed infra. For an example of a process which converts reduced crude of high Conradson Carbon and metals content into a suitable fluid catalytic cracking feedstock, see U.S. Pat. No. 4,243,514 (1981) of Bartholic.

Unfortunately these solutions in the prior art do not work particularly well in more recently used hydrocarbon conversion processes such as in the processing of heavy oils, or a metals removal process by means of sorbents, because one of the things that one tries to do in these processes is to remove as many of the particulate components as possible from a vapor before it enters a cyclone. This is in fact the goal of vented risers disclosed in the following U.S. Pat. Nos.: 4,070,159 (1978) of G. D. Myers et al., 4,390,503 (1983) of P. W. Walters et al. and 4,066,533 (1978) of G. D. Myers et al. Removing from a vapor/particulate stream as many of the particulate components as possible prior to introducing such a stream into a cyclone lessens attrition of the particulates, wear and tear on the cyclone, and may eliminate the necessity for secondary cyclones otherwise required.

Accordingly, there is no method taught in the art which focuses on solving the problem of carbonaceous deposit buildup in a cyclone during separation of paticulates from a hydrocarbon conversion product resulting from feeds of high Conradson carbon precursor content.

"Hydrocarbon conversion processs" is intended to mean for purposes of this specification and claims any process wherein a hydrocarbon feedstock, a coal liquifaction product or feedstock, or shale oil product is contacted with particulate matter to alter in some way some characteristic of such a feedstock. Some examples of such processes are the following: the ART Process in U.S. Pat. No. 4,243,514 (1981) of Bartholic, reduced crude conversion in U.S. Pat. No. 4,332,673 (1982) of G. D. Myers, fluid catalytic cracking, fluid coking, reforming and the like.

"The longitudinal axis of a cyclone" is intended to mean throughout the specification and claims the central axis in the cyclone about which a separation zone is substantially centrosymmetric, e.g. cylindrically symmetric. The separation zone is that location wherein vapors and solids are separated into particulates and vapors by inertial forces, commonly referred to as centrifugal forces.

"Tangential inlets for vapors and solid stream mixtures" is intended to mean any inlet which introduces such a stream into a cyclone separator at an angle transverse to the longitudinal axis of the cyclone. Common transverse angles for example, are anywhere from about 70° to 110°.

BRIEF DESCRIPTION OF THE INVENTION

Figure 3:
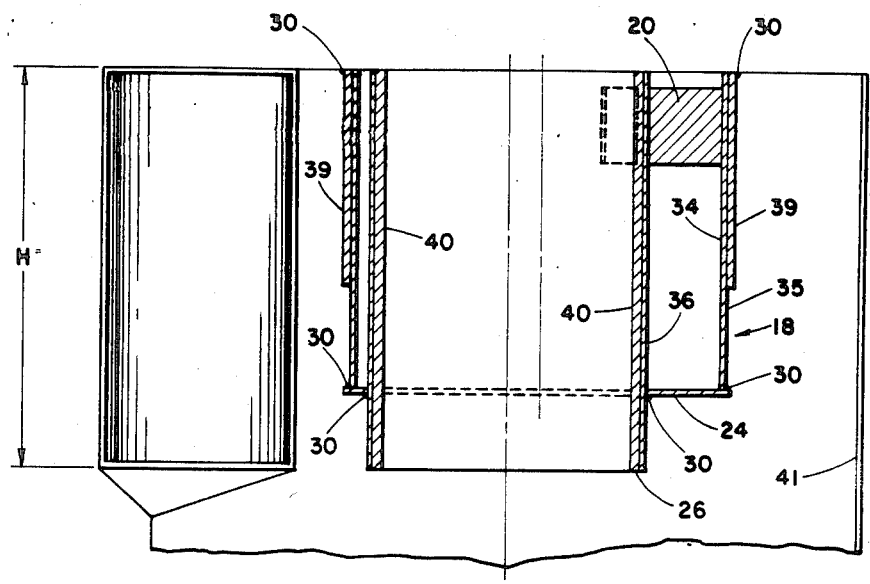
FIG. 3 is a cross-sectional side elevation view of FIG. 4 along line 3—3.

It is an object of this invention to overcome the tendency of conversion products from high Conradson carbon containing feedstocks from plating out in the form of coke in a typical state of the art cyclone, that are conventionally used in a refinery.

It is an object of this invention to provide an easy method to modify a typical cyclone so as to avoid formation of carbonaceous deposits along the outside surface of the vapor outlet tube of the cyclone.

Other objects of this invention will be clear based upon the specification.

To overcome the tendency of conversion products from feedstocks, such as reduced crude oil or vacuum bottoms, having high Conradson carbon to deposit out as coke in an ordinary cyclone, such as are conventionally used in refineries, it has been discovered that narrowing the space between the outlet tube and the circumferential wall surrounding it of a conventional cyclone can substantially lessen, if not substantially eliminate, build-up of coke within the cyclone. A cyclone, for purposes of this invention, includes: at least one separation zone having a top, a bottom and a circumferential wall; at least one tangential inlet through at least a portion of the circumferential wall for a vapor/particulates stream; at least one particulate stream outlet for a particulates rich stream separated from the vapor/particulates stream; and, at least one vapor stream outlet conduit projecting through at least a portion of the top of the at least one separation zone, wherein at least one end of the vapor stream outlet conduit is open to the interior of the at least one separation zone and another end adapted to vent exterior to the at least one separation zone a vapor rich stream separated from the vapor/particulates stream. Though the general overall design of a typical cyclone appears simple, the need to maintain uniform flow throughout the cyclone often results in very unexpected consequences of making what would otherwise appear to be simple and/or minor variations.

Within a typical cyclone having a separation zone defined by a circumferential wall or body, the interior and exterior surfaces of an outlet tube for vapors is substantially centrosymmetric with respect to the longitudinal axis of the cyclone. The cross-sectional area of each segment of the circumferential body as viewed along the longitudinal axis of the cyclone are generally circular. The overall shape of the separation zone is cylindrical but with one or more tapered sections which lead to a particulate conduit. There can be some deviations from cylindrical symmetry in the area of a scroll-type tangential inlet.

The end away from the vapor outlet conduit leads to a particulate stream outlet. The overall cylindrical body, the vapor outlet conduit, and the particulate stream outlet conduit preferably are all radially centrosymmetric with respect to the longitudinal axis of the cyclone. This aids both the centering of and smooth flow pattern for a vortex which is produced during operation of the cyclone. The longitudinal axis in other words runs from the vapor outlet to and through the particulate stream outlet. Preferably, the vapor outlet conduit and the particulate outlet conduits are at opposite ends of the cyclone.

Unlike in a typical cyclone, it has been discovered that there is at least one way to vary the distance between the outer surface of the vapor outlet conduit and the inner surface of circumferential wall surrounding the separation zone without losing any significant amount of cyclone efficiency and still lessen the tendency of carbonaceous deposits from building up within the cyclone. In order to maintain the efficiency as based upon an unmodified prior art cyclone having a separation zone and a longitudinal axis and a vapor outlet conduit having an interior surface centrosymmetric with respect to the longitudinal axis, it has been discovered that if interior surfaces of the vapor outlet conduit which projects within the separation zone of the cyclone are centrosymmetric with respect to the longitudinal axis while at least a portion of exterior surfaces of the vapor outlet conduit which projects within the separation zone of the cyclone are not centrosymmetric, the overall efficiency of the cyclone is not significantly lessened but the tendency to deposit carbonaceous deposits within the cyclone is substantially lessened.

It was discovered that it is possible progressively to narrow the distance between the outside surface of the vapor outlet conduit which projects into the separation zone of a cyclone and the interior surface of the circumferential wall and thereby to lessen the tendency of carbonaceous deposits to form without loss of cyclonic efficiency. One way to achieve such narrowing is to add an insert wall around at least a portion of the vapor outlet conduit in a way preferably not centrosymmetric with respect to the longitudinal axis.

The precise and optimum shape of the insert wall seems to follow the outside surface of carbonaceous deposits, for example coke, that otherwise forms in a typical cyclone not modified in accordance with this invention. As will be discussed later in the specification, the shape of carbonaceous deposits on the vapor outlet conduit tend to be non-centrosymmetric with respect to the longitudinal axis of the cyclone in the presence of a single tangential inlet. It is expected that the shape of the carbonaceous deposits that form will change in the presence of more than one tangential inlet. However, whatever the shape of the carbonaceous deposits, that form, it is within the teaching of this invention to add an insert wall around the vapor outlet conduit so as to create a surface around that vapor outlet conduit that at least in part parallels at least a portion of that surface that is defined by the exterior surfaces of carbonaceous deposits which extend into the separation zone of a cyclone.

Cross-sectional views of the exterior surface of the insert wall as viewed along the longitudinal axis of the cyclone can vary. For example, the outside surface can appear to have the shape of a circle or an ellipse. A circular cross-section which gives riser to an overall cylindrical surface coliner with but off-centered from the longitudinal axis and away from that portion of the cyclone body through which a single tangential inlet enters the cyclone has been found very successful in reducing carbonaceous without significant loss in cyclone efficiency.

Modifications to the outside surface of the vapor outlet conduit to increase the velocity of vapor particulate inlet streams are believed to be beneficial in reducing carbonaceous deposits. One example of a way to increase the velocity of an incoming vapor/particulates stream so as to remove components of that vapor/particulates stream as quickly as possible from that region about the vapor outlet conduit is to introduce vanes or other projections to the exterior surface of the vapor outlet conduit which preferably are in a helical array.

Devices may be added to cyclones of this invention in that region near the particulate outlet conduit to prevent re-entrainment of particulates which would otherwise exit through the particulate outlet conduit. An example of such a device is disclosed in U.S. Pat. No. 4,212,653 (1980) of W. B. Giles.

DETAILED DESCRIPTION OF THE INVENTION

Figure 1:
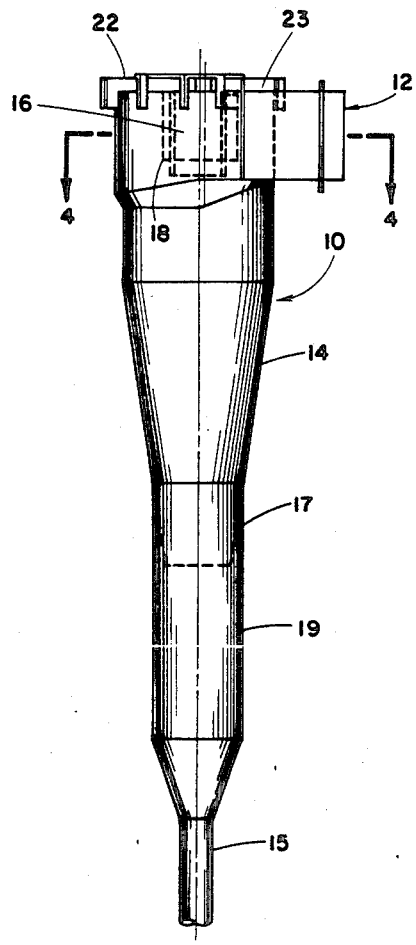
FIG. 1 discloses a perspective side elevation view of a typical cyclone modified in accordance with this invention.

In FIG. 1, there is a cyclone 10 with exterior body 14, inlet 12, dip-leg 15, a dust pot 19 into which there is extended a conical restriction section 17, outlet tube 16, insert wall 18, top end plate 23 and outside support ribs 22. Inlet 12 is rectangular in cross-section, although other cross-sectional shapes are possible. Top end plate 23 forms a seal around outlet tube 16 and exterior body 14, thereby forming an enclosed space, i.e. a separation zone, with only 3 openings: inlet 12, outlet 16 and open dip-leg 15. The distance outlet tube 16 projects through top end plate 23 into the interior of cyclone 10 in the direction of dip-leg 15 is approximately equal to the height, H, of inlet 12. It can project a distance of from 5/10 to 1¼ times H. If outlet tube 16 projects too far into interior of cyclone 10, then the separation efficiency of cyclone 10 is reduced, i.e. the percent of particles at a certain size or greater which are removed, is lessened. If the outlet tube 16 does not project far enough into the interior of cyclone 10, then loss of efficiency also occurs. The preferred distance of projection of outlet tube 16 into the separation zone or interior of cyclone 10 is well understood in the art. Insert wall 18 surrounding at least a portion of outlet tube 16 projects a distance from top plate 23 equal to about 5/10 to 9/10 of that distance of projection of outlet tube 16. Bottom end plate 24 (see FIG. 3) forms a seal between vertical wall 36 of outlet tube 16 and vertical wall 35 of insert wall 18. This seal formed by bottom plate 24 is critical to proper functioning of cyclone 10, because without it there was observed excessive wear of both outlet tube 16 and insert wall 18. If insert wall 18 were to extend a distance substantially equal to end 26 (see FIG. 3) of outlet tube 16 then there would be an excess amount of frictional drag of air circulating around the opening of inlet tube 16 near end 26 which would adversely impair operating efficiency of cyclone 10.

Figure 2:
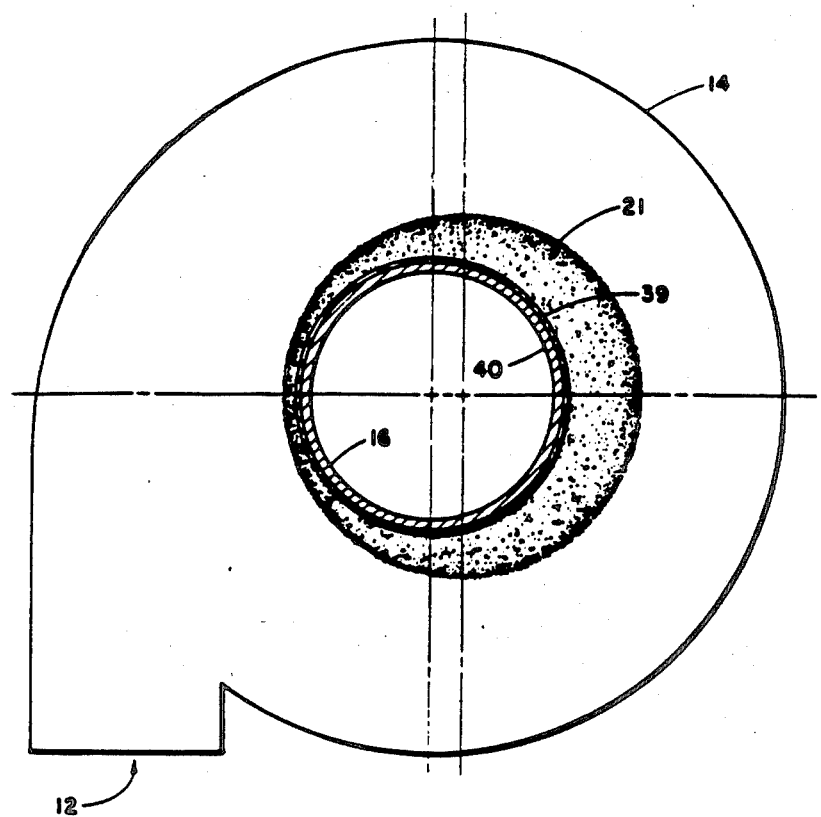
FIG. 2 is a top elevation view in partial cross-section along line 4—4 of FIG. 1 of a typical but unmodified cyclone.

The operation of a cyclone of this invention is as follows. A vapor having entrained particulate material enters inlet 12 and is induced to move along a curved helically downward path. In a typical cyclone, one not having insert wall 18, a carbonaceous deposit would tend to build up along the outside surface of outlet tube 16 as shown in FIG. 2. However, with insert wall 18, shown in FIG. 4, it was found that carbonaceous deposits are very greatly reduced, e.g. by as much as a seventy-five (75) percent reduction over that which would otherwise form.

It is particularly surprising that insert wall 18 does not result in any significant loss of efficiency of a cyclone as shown in the Example.

Figure 4:
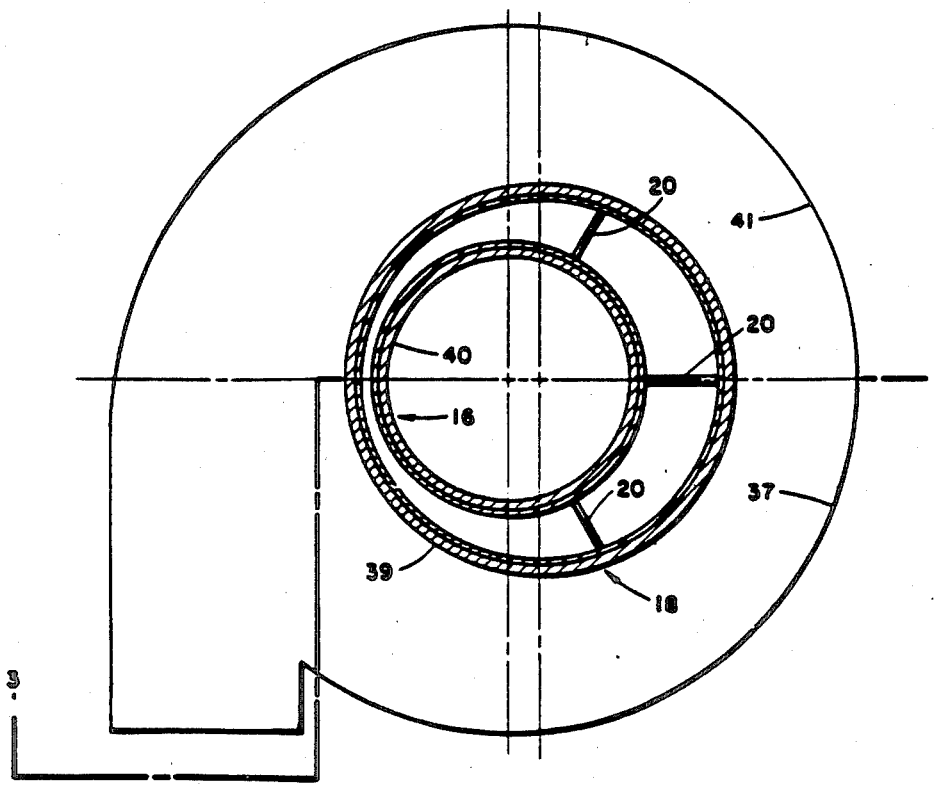
FIG. 4 is a top elevation view in partial cross-section along line 4—4 of FIG. 1.

In FIG. 2, there are shown carbon deposits 21 which form in the absence of insert wall 18 shown in FIGS. 3 & 4. It is an object of this invention to reduce or substantially eliminate such carbon deposits from forming. The maximum thickness of the deposits was observed to reach a thickness of four inches after three weeks of operation. The operation consisted of contacting a 260° C. (500° F.) feedstock with a Conradson Carbon of approximately nine (9), at a weight hourly space velocity (WHSV) of 15 in a riser with a substantially inert sorbent so as to form a vapor/solid mixture having a temperature of about 510° C. (950° F.) with a sorbent to oil ratio of 5, wherein there was also introduced steam at a pressure of about 35 psia.

Contact time in the riser was no more than about 1-2 seconds. The sorbent and vapors are rapidly separated by a ballistic separation. After further separation in a cyclone, the vapors are quickly quenched to temperatures at which thermal cracking substantially ceases. The carbon deposits 21 run from about the bottom of inlet 12 to top end plate 23.

One of the difficulties with having carbonaceous buildup 21 is that periodically the deposits break off in clumps which can and often do result in plugging of dip-leg 15 or impairment of the operation of cyclone 10.

In FIGS. 3 and 4, the construction of insert wall 18 is shown in more detail. There is an attrition resistant surface 40 preferably over the total interior surface of vapor outlet conduit 16. Also, on at least a portion of the exterior surface of insert wall 18, there is an attrition resistant surface 39. FIG. 2 of a conventional outlet conduit 16 which is centrosymmetric with respect to the longitudinal axis of the cyclone 10, discloses an attrition resistant surface 39 which surrounds at least a portion of vapor outlet conduit 16. Since attrition resistant surfaces 39 and 40 are substantially of the same material in either a modified or unmodified cyclone, the same numbering is used. An example of such an attrition resistant surface is produced by means of a castable refractory material supported by a wire mesh attached to a metal conduit. Insert wall 18 is attached preferably by means of port ribs 20. Insert wall 18 may be attached to top plate 23 by means of welds 30. Bottom plate 24 is attached to outlet tube 16 by means of welds 30. Bottom plate 24 is in turn also attached to insert wall 18 by welds 30.

Outside reinforcing ribs 22 (FIG. 1) provide additional strength and support. Support ribs 20 (FIGS. 3 and 4) attached by means of welds 30 between outlet tube 16 and insert wall 18 provide support and strength.

Materials that are appropriate for the exterior body 14 (FIG. 1) of cyclone 10 depend on the operating conditions of for example temperature and pressure. In the case where high Conradson carbon feeds are being contacted by sorbents the temperature of vapors in the cyclone are generally in the ranges disclosed in U.S. Pat. No. 4,243,514 (1981) of Bartholic and U.S. Pat. No. 4,347,122 (1982) of Myers et al. Particulate content of vapors entering the cyclone is about 0.1 to 1.25 lbs per cubic foot of vapor/particulate mixture. The cubic feet per hour of mixture entering the cyclone generally is in the range 100-500, more usually 250-350. Examples of suitable materials: for cyclones; for insert wall 18; for welds 30; and for the outlet tube 16; are substantially the same, e.g. carbon steel, or 387 material as per ASME.

Clearly the arrangement as disclosed in FIGS. 1, 3 and 4 is such that there is intended to be substantially no circulation or movement of particulate/vapor streams in the space between outlet 16 and insert wall 18.

Without being limited by any particular theory of operation, applicants believe that the insert wall 18 acts as a means for maintaining velocity of vapors entering inlet 12 so that the residence time of the vapors within the interior of cyclone 10 is kept at a minimum. The distance between wall 18 and the interior surface 37 of exterior body 14 of cyclone 10 parallels the thickness of observed carbonaceous deposits 21. It was found that by increasing the circulation rate of vapors between vapor outlet conduit 16 and circumferential wall 41, carbonaceous deposits can be avoided. Surprisingly, insert wall 18 did not significantly impair the efficiency or operating characteristics of cyclone 10 as shown in EXAMPLE.

EXAMPLE

To determine changes in efficiency, if any, as a result of using an insert wall in accordance with this invention, a primary and a secondary cyclone were used. The observed results indicated that there was no substantial loss in efficiency as a result of modifying, the primary cyclone in accordance with this invention. The primary cyclone both with and without the modification in accordance with this invention was individually tested for efficiency with two different input streams. The first input stream was from a vented riser having vapor/particle streams moving up the riser at 34.9 ft/sec and the second input stream, 42.3 ft/sec. Keeping the input streams the same but changing only the primary cyclone and measuring the amount of particles collected in the secondary cyclone, which received all of the effluent vapors from the primary cyclone, one obtains a measure of separation efficiency. To avoid possibility of carry over from the dip-leg of the initial cyclone being tested, the dip-leg was sealed during efficiency measurements. The following is a table giving the observed results. These results indicate that there was no substantial loss in efficiency as a result of modifying the primary or initial cyclone in accordance with this invention.

Cyclone Efficiency Measurements

| Time (sec) | Catalyst Loss (g) | Flow Rate (lb/sec) | Riser Velocity ft/sec | Efficiency % |     |       |
| --- | --- | --- | --- | --- | --- | --- |
| Standard Cyclone | | | | | | |
| 315.1 | 0    | .0452 | 42.3 | 100   |     |       |
| 243.4 | 3.55 | .0584 | 42.3 | 99.95 |     |       |
| 367.4 | 1.75 | .0388 | 42.3 | 99.97 |     |       |
|       |      |       |      |       | ave | 99.97 |
| 240.3 | 11.3 | .0593 | 34.9 | 99.83 |     |       |
| 167.0 | 4.96 | .0853 | 34.9 | 99.92 |     |       |
| 218.7 | 9.03 | .0652 | 34.9 | 99.86 |     |       |
| 190.5 | 4.43 | .0748 | 34.9 | 99.93 |     |       |
|       |      |       |      |       | ave | 99.89 |
| Redesigned Cyclone | | | | | | |
| 276.1 | 0.86 | .0516 | 42.3 | 99.99 |     |       |
| 264.9 | 3.55 | .0538 | 42.3 | 99.95 |     |       |
| 251.8 | 5.82 | .0566 | 42.3 | 99.91 |     |       |
|       |      |       |      |       | ave | 99.95 |
| 165.7 | 1.75 | .0850 | 34.9 | 99.97 |     |       |
| 153.9 | 3.55 | .0926 | 34.9 | 99.95 |     |       |
| 159.8 | 3.55 | .0917 | 34.9 | 99.95 |     |       |
| 168.9 | 0.86 | .0844 | 34.9 | 99.99 |     |       |
|       |      |       |      |       | ave | 99.97 |

Total catalyst for each test - 14.25 lbs.

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to patents made in the specification is intended to result in such patents being expressly incorporated herein by reference.

The invention which is claimed is:

1. An improved cyclone for lessening significantly the tendency of hydrocarbon conversion products from high Conradson Carbon feedstocks from depositing carbonaceous deposits on surfaces there within, said improved cyclone comprises:

at least one separate zone having a top, a bottom, a circumferential wall and a longitudinal axis;

at least one tangential inlet with a vertical opening through at least a portion of said circumferential wall near said top for a vapor/particulates stream;

at least one particulate stream outlet conduit near said bottom for a particulate rich stream separable from said vapor/particulates stream; and at least one vapor stream outlet conduit means projecting through at least a portion of said top and having an interior surface, an exterior surface, at least one end being open to the interior of said at least one separation zone and another end adapted to vent exterior to said separation zone a vapor rich stream separable from said vapor/particulates stream;

wherein said exterior surface is not centrosymmetric with respect to said longitudinal axis and is in cross-section as viewed along the longitudinal axis in a shape selected from the group consisting of a circle and an elipse; wherein distances between different portions of said exterior surface of said outlet conduit means and that portion of interior surfaces of said circumferential wall nearest thereto vary so as to reduce the tendency for carbonaceous deposits to form on said exterior surface of said outlet conduit means.

2. The improved cyclone of claim 1, wherein interior surfaces of said circumferential wall are substantially radially centrosymmetric with respect to said longitudinal axis of said improved cyclone.

3. The improved cyclone of claim 1, wherein the at least one vapor stream outlet conduit means projects a distance in the range of from about 5/10 to about 1¼ times the vertical height of the tangential inlet.

4. A method for lessening formation of carbonaceous deposits during separation of particulates from hydrocarbon conversion products from high Conradson carbon feedstocks with a cyclone comprising: introducing said high Conradson carbon feedstock into a tangential inlet of said cyclone which has at least one separation zone, a top, a bottom, a circumferential wall having an interior surface which establishes a longitudinal axis for the cyclone, said tangential inlet extends through at least a portion of said circumferential wall near said top, and at least one vapor outlet conduit that projects through at least a portion of said top, and has an interior surface and an exterior surface, and at least two ends, wherein one end is open to the interior of said separation zone and the other adapted to vent vapors exterior to said separation zone; providing on the exterior surface of at least a portion of said vapor outlet with an insert wall capable of withstanding temperatures and other operating conditions appropriate to operation of said cyclone, wherein exterior surfaces of said insert wall surrounding said at least a portion of said at least one vapor outlet are not centrosymmetric to said longitudinal axis, whereby the tendency for carbonaceous deposits to form on said exterior surface of said vapor outlet is reduced; and removing primarily vaporous components through said at least one vapor outlet conduit; wherein different portion of said exterior surface of said outlet conduit and that portion of interior surfaces of said circumferential wall nearest thereto generally parallel distances between a portion of exterior surfaces of carbonaceous deposits that form in a cyclone having a segmented separation zone with a longitudinal axis defined by a circumferential wall, and an outlet tube for vapors which is substantially centrosymmetric with respect said longitudinal axis, wherein each said segment has a cross-sectional area, as viewed along said longitudinal axis, which is generally circular, and a portion of said interior surface of said circumferential wall nearest to said portion of exterior surfaces of said carbonaceous deposits.

5. An improved cyclone for lessening significantly the tendency of hydrocarbon conversion products from high Conradson carbon feedstocks from depositing carbonaceous deposits within said cyclone, said improved cyclone comprises:

a separation zone having a top, a bottom and a circumferential wall, wherein said separation zone defines a longitudinal axis about which said separation zone is substantially radially centrosymmetric;

a tangential inlet with a vertical opening through at least a portion of said circumferential wall near said top for a vapor/particulates stream;

a particulate stream outlet conduit near said bottom for a particulate rich stream separable from said vapor/particulates stream; and a vapor stream outlet conduit means projecting through at least a portion of said top and having an interior surface, an exterior surface, and at least one end open to the interior of said separation zone and another end adapted to vent exterior to said separation zone a vapor rich stream separable from said vapor/particulates stream;

wherein said exterior surface of said vapor outlet conduit is not centrosymmetric with respect to said longitudinal axis, whereby distances between different portions of said exterior surface of said vapor stream outlet conduit means and that portion of interior surfaces of said circumferential wall nearest thereto vary so as to reduce the tendency for carbonaceous deposits to form.

6. The improved cyclone of claim 5, wherein said interior surfaces of said vapor stream outlet conduit means are substantially radially centrosymmetric with respect to the longitudinal axis of said improved cyclone.

7. The improved cyclone of claim 5, wherein the vapor stream outlet conduit means projects a distance in the range of from about 5/10 to about $1\frac{1}{4}$ times the vertical height of the tangential inlet.

8. The improved cyclone of claim 5, wherein the interior surface of said vapor stream outlet conduit means is symmetrical with respect to the longitudinal axis of said cyclone and said exterior surface projects in the range of 5/10 to 9/10 of that distance which the vapor stream outlet conduit means projects through at least a portion of said top.

* * * * *